United States Patent

[11] 3,616,001

| [72] | Inventor | Kenneth J. Addis<br>Spartanburg, S.C. |
|---|---|---|
| [21] | Appl. No. | 730,301 |
| [22] | Filed | May 20, 1968 |
| [45] | Patented | Oct. 26, 1971 |
| [73] | Assignee | Deering Milliken Research Corporation<br>Spartanburg, S.C. |

[54] VIBRATORY METHOD FOR SECURING A CONTINUOUS THREAD ON A SUPPORT SURFACE
9 Claims, 4 Drawing Figs.

[52] U.S. Cl. ................................................. 156/177,
156/117
[51] Int. Cl. ........................................ B32b 5/12,
B29h 17/28
[50] Field of Search ......................................... 156/117,
397, 169–181, 123, 549

[56] References Cited
UNITED STATES PATENTS
3,010,508  11/1961  Wilson ........................ 156/549
3,082,140  3/1963  Vanzo .......................... 156/117
3,113,738  12/1965  Vanzo .......................... 156/117
3,422,874  1/1969  Weitzel ........................ 156/123

FOREIGN PATENTS
808,342  2/1969  England ...................... 136/397

Primary Examiner—Benjamin A. Borchelt
Assistant Examiner—Stephen C. Bentley
Attorneys—Norman C. Armitage and H. William Petry ABSTRACT: A method and apparatus for securing at least one continuous length of thread on a support surface in a desired pattern, wherein the thread and support surface have a pressure sensitive adhesive affinity for each other, and wherein the thread is longitudinally laid on the support surface from a thread guide mechanism moving relative to the support surface while a pressure is intermittently applied against the thread closely adjacent its lay point to minimize movement of the thread on the surface due to tension forces acting on the thread and to minimize damage or dislocation of the thread due to frictional engagement with the thread guide mechanism.

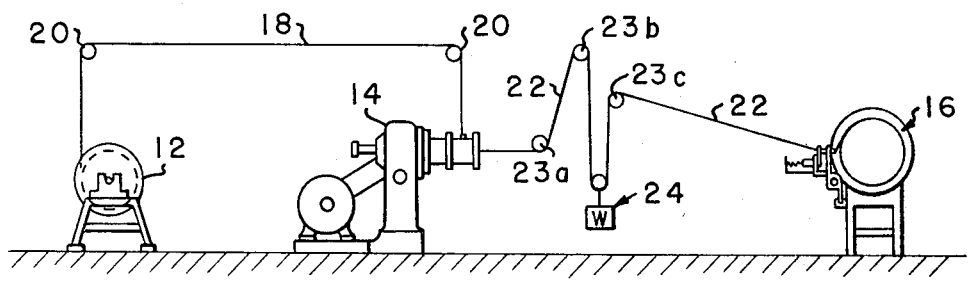
FIG.-1-
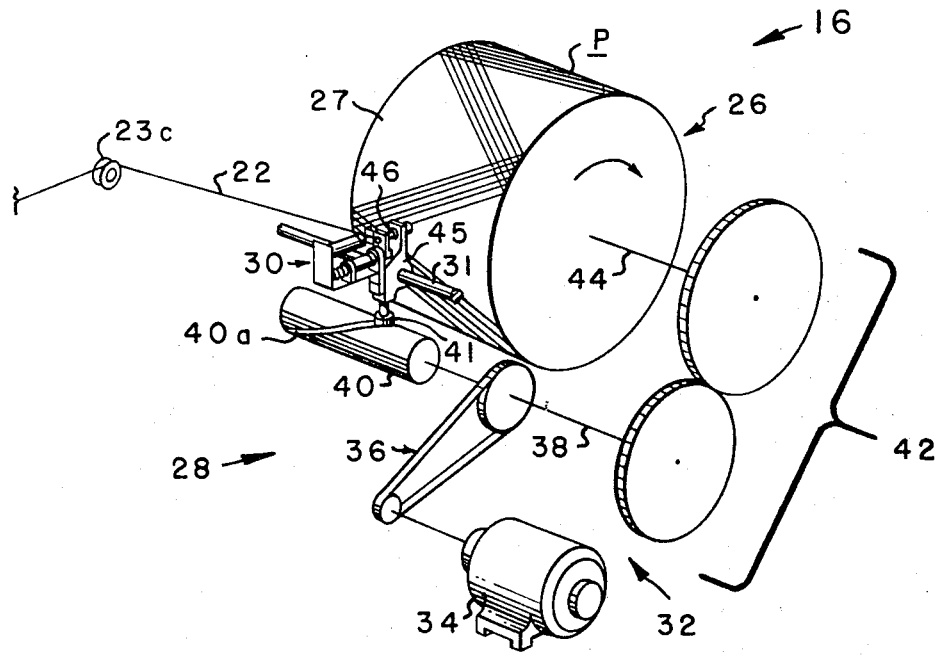
FIG.-2-
INVENTOR.
KENNETH J. ADDIS
BY
Luke J. Wilburn, Jr.
ATTORNEY

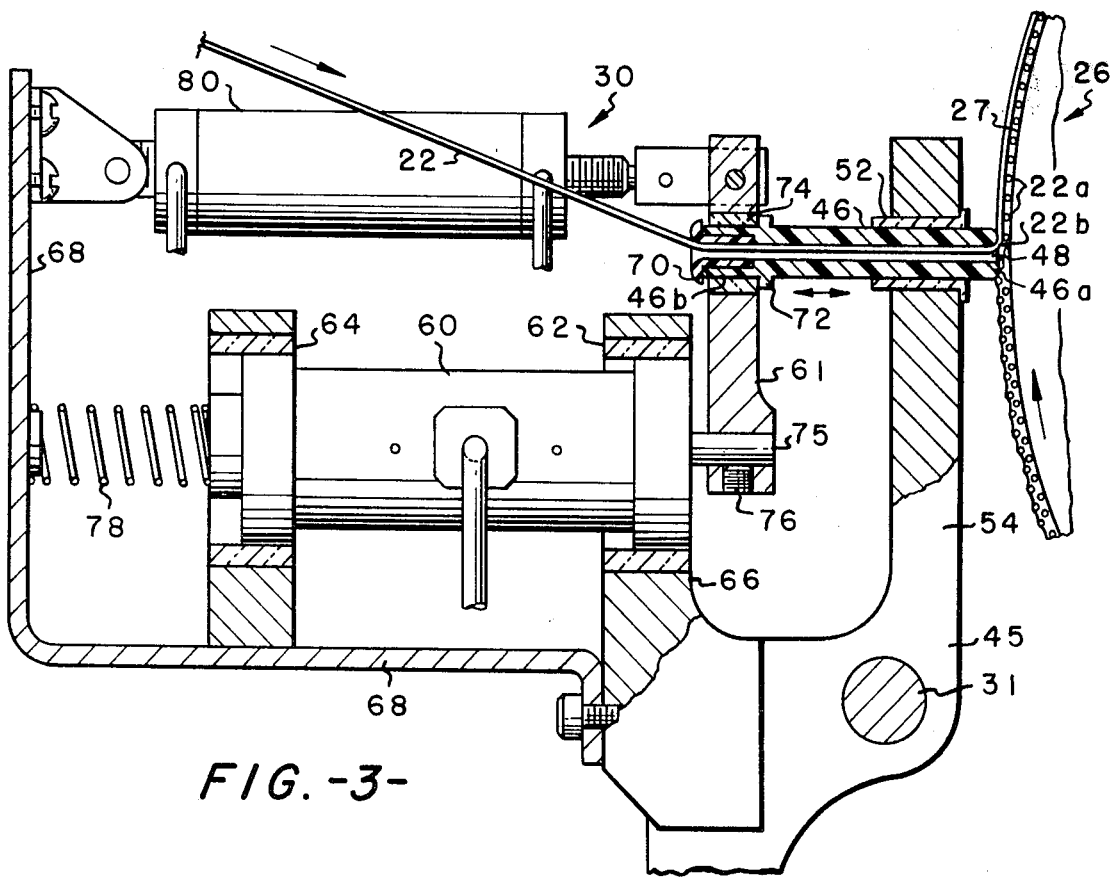
FIG.-3-
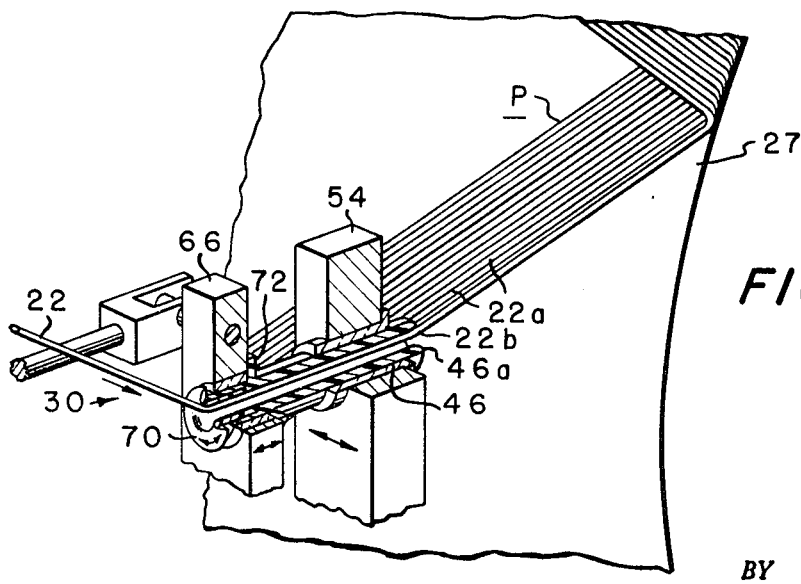
FIG.-4-
INVENTOR.
KENNETH J. ADDIS
BY
Luke J. Wilburn, Jr.
ATTORNEY

VIBRATORY METHOD FOR SECURING A CONTINUOUS THREAD ON A SUPPORT SURFACE

This invention relates to a method and apparatus for securing a continuous thread on a support surface in a desired pattern, and more particularly to a method and apparatus for forming reinforcing belts for use in the fabrication of pneumatic tires.

It is known in the production of pneumatic tires, both of the radial and bias ply type constructions, to provide an annular reinforcing belt, or breaker strip, about the periphery of the tire between the tread and main body or carcass portion to increase resistance of the tire to road hazards and to provide greater road stability and longer wear life for the tire. Such reinforcing belts are formed of one or more layers, or plies of parallel, relatively inextensible threads or cords coated with or embedded in a suitable insulating material, such as unvulcanized rubber, plastic, or other resinous material which serves to prevent direct contact of the threads and anchor them in a desired pattern in the belt. The threads in adjacent plies of the belt generally extend in opposing directions to each other and in directions biased with respect to the longitudinal axis of the belt. After its fabrication, the belt is positioned on the periphery of a tire carcass, a tread portion formed thereover, and the composite tire vulcanized in conventional manner to form an integral, belted tire construction.

Reinforcing belts of the type described may be formed by various methods, several of which are disclosed in U.S. Pat. No. 2,982,327. One particularly desirable method for forming such belts, in that it reduces the number of free ends of reinforcing thread in the belt and produces a splice-free reinforcing belt construction, involves winding one or more continuous lengths of thread onto a rotating support surface, such as a revolving drum, while employing reciprocating guide means to traverse the drum surface and lay the thread in a generally zigzag path thereon. Prior to winding, the thread is coated or wrapped with a suitable protective covering, such as unvulcanized rubber, which is quite tacky or sticky and provides a pressure sensitive adhesive affinity between the thread and support surface to permit it to be adhesively anchored on the drum surface in the desired path in which it is laid, and during winding, the belt is formed by incrementally displacing the zigzag path along the periphery of the drum to build up a plurality of overlying plies of adhesively secured parallel threads.

Although annular reinforcing belts formed by the above-described method possess desirable structural qualities not attainable by other known methods, several problems are presented in the production of belts in this manner. The tension created in the thread by its longitudinal movement from a thread supply source onto the supporting surface tends to displace the thread from the curvilinear path in which it is laid if it is not quickly and firmly secured to the support surface at a point close to the thread laying point. This tendency is particularly pronounced at points where the direction of the thread path abruptly changes, such as at the side edges of the belt when a zigzag pattern is employed. For this reason existing apparatus for forming belts in the above manner generally utilize thread guide mechanisms which lay the thread in a desired pattern on the support surface while continuously pressing the thread against the surface to prevent its dislocation by the aforementioned tensional forces. However, due to the relatively soft, deformable nature of the insulating rubber coating on the thread and its relatively high coefficient of friction, it is difficult to maintain sufficient pressure on the thread to insure its adhesion to the support surface without causing damage to the coating or dislocating the thread path due to frictional engagement by the thread guide mechanism.

Attempts have been made to reduce friction of the moving thread guide mechanism on the thread by providing a freely rotatable element, such as a pivotally mounted roller or grooved wheel adjacent the thread laying point, which element is biased against the thread support surface by suitable means, such as a spring, and engages the thread on the thread path to press it against the surface as it rolls thereover. Although guide means employing such rotatable elements are generally effective to secure the thread in the desired path when the thread is laid in a substantially straight line over the support surface, they are relatively ineffective at points of abrupt change in the direction of the thread path because of the difficulty of quickly reorienting the rotational axis of the rotatable pressing element for movement in a new thread path direction. In such instances, unless relatively complicated and expensive control means are employed to automatically reposition the rotational axis of the elements for a new direction of movement, the rotatable element tends to become canted and drag along the support surfaces, causing dislocation of the thread on the surface and damage to the thread coating.

It is therefore an object of the present invention to provide a method and apparatus for positively securing a continuous thread on a support surface in a desired pattern which overcomes, to a great extent, the difficulties heretofore experienced in the prior art.

It is another object to provide a method of adhesively securing a continuous length of thread on a support surface in a desired pattern, wherein the thread and support surface have a pressure sensitive adhesive affinity, with accurate positioning of the thread on the support surface and without aberration of the thread from the thread laying path or damage to the thread due to external forces acting thereon.

It is a further object to provide an apparatus for adhesively securing a continuous thread on a support surface in a desired pattern by intermittently pressing the thread against the surface with sufficient force to positively secure it thereto while permitting substantially unrestricted movement of the thread onto the surface.

Certain objects of the invention have been stated, other objects will become apparent from the following detailed discussion of the invention and description of the drawings, in which FIG. 1 is a diagrammatic presentation of apparatus employed in the production of reinforcing belts for pneumatic tires in which the novel features of the present invention are incorporated;

FIG. 2 is a diagrammatic presentation of the winding drum of the apparatus seen in FIG. 1, and showing in more detail the associated components for laying a continuous thread on the surface of the drum in a desired pattern;

FIG. 3 is an enlarged fragmentary right side elevation view, with portions shown in section, of the reciprocating guide mechanism for laying thread on the surface of the drum seen in FIG. 2; and FIG. 4 is an enlarged fragmentary perspective view, with portions shown in section, of the thread guide tube of the guide mechanism seen in FIG. 3, showing in greater detail its position with respect to the thread support surface of the drum during the winding operation.

Referring more specifically to the drawings, FIG. 1 shows apparatus for producing annular pneumatic tire reinforcing belts by a continuous thread-winding process. As shown schematically, the apparatus broadly includes a thread supply source, such as a rotatable spool of thread 12, an extruder device 14 for coating the thread, and a belt-forming device 16. A continuous thread 18, which may be composed of various relatively inextensible materials conventionally employed as tire cord, such as fiber glass, rayon, cotton, polyester, nylon, wire or the like, and may be in single or multistrand, twisted or untwisted form, is longitudinally directed by thread guides 20 from the thread supply spool 12 to the extruder device 14 where the moving thread is coated, in conventional manner, with a protective coating, such as unvulcanized rubber. The rubber coated thread 22, which possesses a tacky, pressure-sensitive adhesive surface characteristic, is directed by thread guides 23a, 23b, 23c to the belt forming device 16 where it is wound, in a manner to be described, to form an annular reinforcing belt. A weighted movable pulley 24 is positioned on the thread path between the guides 23b, 23c and functions to vary the length of the thread path to compensate for slight variations between the rate of extrusion of the thread from the extruder device 14 and the takeup speed of the belt-forming device 16.

As better seen in FIG. 2, the belt-forming device 16 generally includes a rotatable winding drum 26 having a generally cylindrical outer surface 27 for supportably receiving the thread, and means, generally indicated at 28, associated therewith for laying the thread in a path on the thread support surface 27 to form a desired pattern while intermittently pressing the thread against the surface at a position closely adjacent its lay point thereon to facilitate adhesion of the thread to and positive positioning of the thread path on the support surface. During the winding operation the belts may be formed by laying the thread in a plurality of plies directly on the peripheral surface of the drum, or if desired, a substrate layer, such as an elongate band of unvulcanized rubber, may be placed on the drum to serve as the thread support surface and become a part of the final belt construction.

The thread laying and pressing means 28 generally comprises a thread guide mechanism 30 mounted for reciprocal movement across the surface 27 of the winding drum on an elongate support rod, a portion of which, 31, is shown in FIG. 2, and the drive means 32 for moving the guide mechanism 30 and support surface 27 of the drum relative to each other to lay the thread 22 in a desired path thereon. As shown schematically in FIG. 2, drive means 32 includes a motor 34, driven by a suitable power supply, not shown, which is drivingly connected by a belt and pulley arrangement 36 to a rotatable shaft 38. Shaft 38 is, in turn, directly connected to a barrel cam 40 and drivingly connected by a suitable gear train 42 to the drive shaft 44 of the winding drum 26 such that power from motor 34 simultaneously rotates the barrel cam 40 and winding drum 26 during the winding operation. A cam follower 45 connected to the thread guide mechanism 30 engages a groove 40a in the surface of the barrel cam and the groove is configured so that during rotation of the winding winding drum 26, the thread guide mechanism 30 is reciprocated across the surface 27 of the drum transverse to its direction of rotation to lay the thread in a zigzag path thereon. As is conventional, the gears of gear train 42 are configured to incrementally displace the position of the thread path on the drum surface during subsequent revolutions of the drum and produce an overlapping thread pattern P (FIGS 2 and 4) to form the reinforcing belt.

The thread guide mechanism 30 which incorporates the novel features of the present invention is best shown in FIGS. 3 and 4 and includes a generally Y-shaped support member 45 which is mounted for reciprocation on the support rod 31. A thread guide tube 46, positioned with its longitudinal axis generally perpendicular to the surface 27 of the drum 26, is mounted for longitudinal and rotational movement in a bushing 52 located in an upper end portion of one arm 54 of support member 45. One end 46a of the guide tube 46 is positioned closely adjacent the support surface 27 of the winding drum and has a thread outlet 48 for longitudinally directing the thread onto the support surface 27. The tube 46 is formed preferably of a hard material having a relatively low coefficient of friction, such as plastic, stainless steel, aluminum or the like, and the end portion 46a of the tube has a smooth curvilinear surface (FIGS. 3 and 4) to facilitate passage of the thread 22 from the outlet 48 onto the thread support surface and to minimize frictional engagement of the tube with portions 22a of thread previously laid on the support surface 27 over which the tube may pass.

Means are provided for repeatedly moving the guide tube 46 toward and away from the support surface 27 to intermittently apply pressure against the portion of the thread 22b emerging from the thread tube outlet and thereby facilitate its adhesion to and positive positioning on the support surface. Such means comprises a pneumatic vibrator 60 which is operatively attached to the guide tube 46 by a connecting arm 61. As shown in FIG. 3, the ends of vibrator 60 are mounted in annular bushings 62, 64 which are supported on an upstanding arm 66 of the support member 45 and on a bracket 68 attached thereto, thus permitting reciprocatory movement of the vibrator 60 toward and away from the drum surface 27. The rear portion 46b of the thread guide tube is provided with a pair of spaced radial flanges 70, 72 and the connecting arm 61 is secured thereto by means of a bushing 74 on the connecting arm which surrounds the tube between the flanges. Operation of the vibrator 60 thus causes high speed reciprocatory movement of the tube 46 along its axis generally perpendicularly to the support surface 27 to firmly press the thread against the support surface. By mounting the guide tube 46 in bushings 52, 74, the tube is free to rotate or roll about its longitudinal axis during its translatory and reciprocatory movement relative to the support surface 27, thereby minimizing frictional engagement of the moving tube with thread in previously laid portions 22a of the thread path adjacent the tube (FIG. 4).

The lower end of connecting arm 61 is adjustably secured to a stud 75 on the vibrator by a setscrew 76 to permit adjustment of the distance of the end 46a of the thread tube from the support surface 27 to compensate for different diameter thread being employed in formation of the belts.

A compression spring member 78 is positioned between the outer end of the vibrator and the bracket 68 to urge the vibrator and thread guide tube in the direction of the support surface 27 and it serves to bias the outlet end of the thread guide tube toward the surface on which the thread is being deposited, thereby giving direction to the vibration superimposed on the guide tube by the vibrator and directing the effect of the vibration to the point of contact of the thread between the outlet end of the tube and the thread support surface to intermittently press the thread against the surface and positively secure it thereon.

To prevent undesirable secondary low frequency, large amplitude vibrations of the thread tube 46 against the support surface 27 of the winding drum, and to further insure proper intermittent application of pressure against the thread, damping means, such as a hydraulic cylinder 80 (FIG. 3) may be operatively connected to the upper portion of the connecting arm 61 to facilitate uniform reciprocation of the thread tube against the drum surface.

In operation, the winding drum 26 is continuously rotated to draw a continuous length of thread 22, which has been coated at the extruder device 14 with unvulcanized rubber, over the thread guides and through the thread guide tube 46 where it longitudinally passes onto the support surface 27 from a thread laying point at the outlet end of the tube, while the thread guide tube 46 is reciprocated simultaneously across the surface of the drum to lay the thread in a zigzag path thereon. During movement of the thread guide across the surface of the drum, vibrator 60 is operated continuously to reciprocate the tube toward the surface so that the outlet end 46a of the tube intermittently presses the thread against the surface as it is laid thereon to positively adhere it to the surface and prevent dislocation of the thread path due to the tension forces acting on the thread. By employing vibratory means to reciprocate the guide tube against the support surface, an additional benefit is obtained in that the high speed reciprocation of the guide tube along its longitudinal axis facilitates passage of the thread through the tube and on to the support surface, thus aiding in reducing tension on the thread at its point of lay on the surface.

By employing only intermittent pressure to secure the thread in the proper path on the thread surface, minimal frictional contact can be maintained between the moving guide tube and the thread, thereby avoiding possible damage to the thread or its dislocation from the support surface by relative movement of the guide tube thereover. Due to the regular, smooth curvilinear surface of the guide tube outlet, it is unnecessary to reorient the guide tube to a new path of travel across the thread support surface at points of abrupt change in the thread path, thus eliminating the problem inherent in the employment of the rotating pressure rolls of the prior art.

By further mounting the tube for rotation about its longitudinal axis, it is free to roll along the surface of the thread it engages as it moves along the support surface, thereby reducing, to a great extent, the friction on the thread due to its movement thereover.

Although the means for applying intermittent pressure against the thread to secure it to the support surface have been described and shown herein as a reciprocating thread guide tube and a pneumatic vibrator, other means may be employed for applying intermittent pressure to the thread without departing from the scope of the present invention. For example, pressure may be intermittently applied to the thread by a separate element, such as a plunger, located closely adjacent the guide tube. Similarly, other mechanical, electromechanical, or electromagnetic devices may be employed in place of the pneumatic vibrator to move the pressing element toward and away from the surface of the drum, and the exact movement pattern of the pressing element may be varied to achieve the particular results desired. In like manner, the invention is not limited to the employment of a thread having a pressure-sensitive adhesive coating, but can be utilized in any situation wherein the continuous thread and the surface upon which it is laid have pressure sensitive adhesive affinity for each other.

Although the invention has been described and shown with reference to apparatus for forming annular reinforcing belts used in the construction of pneumatic tires, it should be understood that the present invention is not limited in its application to the construction of reinforcing belts, but may be equally adapted to the formation of various products wherein it is desired to secure a continuous thread to a support surface and wherein the thread laying point and thread support surface are moved relative to each other to form a desired thread pattern thereon.

From the foregoing description, it can be seen that the method and apparatus of the present invention may be employed to secure a continuous thread on a support surface in a desired pattern to form various products, with uniform application of the thread on the support surface and without dislocation or deformation of the thread during changes of the thread path thereon.

The foregoing drawings and specification have set forth preferred embodiments of the invention and, although specific terms have been employed, they are used in a generic and descriptive sense only and not for purposes of limitation, the scope of the invention being limited only by the extent of the following claims.

That which is claimed is:

1. A method of securing at least one continuous length of thread on a support surface in a desired pattern and wherein the thread and support surface have a pressure sensitive adhesive affinity for each other, comprising the steps of
   a. longitudinally passing the thread onto the support surface from a thread laying point adjacent the surface while moving the laying point and support surface relative to each other to lay the thread in a desired generally continuous path on the surface, and
   b. intermittently pressing the thread against the support surface along the thread path thereon to facilitate adhesion of the thread to and positive positioning of the thread path on the support surface.

2. A method as defined in claim 1 wherein the thread is pressed against the support surface by intermittently applying a pressure against the thread in a portion of the thread path closely adjacent the laying point to minimize movement of the thread on the surface due to tension forces acting on the thread during its lay.

3. A method as defined in claim 1 wherein the thread is pressed against the support surface by intermittently applying a pressure against the thread at the point of lay of the thread on the support surface to prevent dislocation of thread path due to tension forces acting on the thread during changes in the direction of the lay of the thread on the support surface.

4. A method as defined in claim 1 wherein the support surface is an elongate band and said relative movement between the surface and the thread laying point is effected by longitudinally moving the band past the laying point.

5. A method as defined in claim 4 wherein the relative movement is further effected by moving the laying point transversely to the direction of movement of the band.

6. A method as defined in claim 4 wherein the band is generally cylindrical and is rotated about its cylindrical axis to effect longitudinal movement thereof.

7. A method as defined in claim 6 wherein the relative movement is further effected by reciprocating the thread laying point across the band during movement thereof to produce a zigzag thread path thereon.

8. A method of securing at least one continuous length of thread on a support surface on a desired pattern and wherein the thread and support surface have a pressure sensitive affinity for each other, comprising the steps of
   a. longitudinally directing a thread from a thread guide tube having an outlet positioned closely adjacent the support surface while moving the tube and surface relative to each other to lay the thread in a desired generally continuous path on the surface, and
   b. repeatedly moving the guide tube toward and away from the support surface to intermittently press the thread against the surface at spaced points along the thread path thereon to facilitate adhesion of the thread to and positive positioning of the thread path on the support surface.

9. A method as defined in claim 8 wherein the support surface is a substrate layer and wherein said guide tube is repeatedly moved toward and away from the surface of the substrate layer by vibrating the tube along its axis generally perpendicularly to the substrate surface to facilitate passage of the thread through the tube.